United States Patent [19]

Sullivan et al.

[11] Patent Number: 5,209,389
[45] Date of Patent: May 11, 1993

[54] SOLDER PUMP BUSHING SEAL

[75] Inventors: Kyle C. Sullivan, Worcester, Mass.; Paul J. Caine, Smithfield, R.I.

[73] Assignee: Digital Equipment Corporation, Maynard, Mass.

[21] Appl. No.: 841,671

[22] Filed: Feb. 26, 1992

[51] Int. Cl.$^5$ .............................. B23K 1/08
[52] U.S. Cl. ...................... 228/37; 228/260
[58] Field of Search .................. 228/37, 56.1, 260

[56] References Cited

U.S. PATENT DOCUMENTS 4,986,511  1/1991  Irby et al. ................ 251/1.3

FOREIGN PATENT DOCUMENTS 61-132268  6/1986  Japan .................... 228/37
0578170   10/1977  U.S.S.R. ................ 228/37

Primary Examiner—Richard K. Seidel
Assistant Examiner—Jeffrey T. Knapp
Attorney, Agent, or Firm—Ronald C. Hudgens; Barry Young

[57] ABSTRACT

Provided is an apparatus for circulating a body of molten solder. An enclosure, attached to the base of an impeller motor extends downward into the body of molten solder. A rotatable shaft, advantageously attached to the impeller motor by a flexible coupling device, extends through the interior of the enclosure, terminating beyond the open end of the enclosure and connected at that end to an impeller. A seal between the rotatable shaft and the open end of the enclosure acts to prevent solder from entering the interior of the enclosure. The seal is comprised of a self-lubricating material which expands as the temperature of solder increases, forming a solder tight fit between the rotatable shaft and the seal and further securing the exterior of the seal to the interior wall of the enclosure while permitting shaft rotation. The self-lubricating and high temperature characteristics of the sealing material preclude the production of by-products from wear by the rotatable shaft.

6 Claims, 3 Drawing Sheets

SOLDER PUMP BUSHING SEAL

FIELD OF THE INVENTION

This invention relates to an apparatus for circulating solder in a container and more particularly to the elimination of circulatory by-products in solder.

BACKGROUND OF THE INVENTION

A wave soldering machine is used to solder components to a printed circuit board upon which they have been pre-mounted. Basic wave solder machines consist of an impeller mounted on the lower end of a rotatably driven pump shaft. The shaft and impeller are submerged in a body of molten solder, and rotated by means of a motorized pump operating above the surface of the solder. The impeller motion produces a wave at the surface of the solder bath. A circuit board is passed over the top of a solder wave to just skim its surface. During this passage, strong, conductive solder joints must be formed between the components and the board. Impurities in the solder may weaken the solder joints. A common impurity found in the wave soldering process is "dross".

Dross accumulates on the surface of the solder bath. The accumulation of the dross presents three problems: interference with the solder joints on printed circuit boards; seizure of the impellers; and hazards to operators when it is cleaned off a surface of the solder bath. The necessity of closing down the machine to clean the dross reduces the productivity of the manufacturing process. Hence, it would be desirable to eliminate dross from the wave soldering process.

It has been found that dross is produced in a wave soldering system when the frictional forces of mechanical devices rotating within the solder break down the solder into a dust. The rotatably driven shaft which rotates the impeller effectively grinds the solder into its component materials. It would be desirable to protect the solder from the force of the rotational shaft, and thereby preclude the production of dross.

U.S. Pat. No. 4,011,980 issued Mar. 15, 1977 to Dvorak et al. Dvorak discloses a wave soldering device comprising a support tube descending from an impeller motor to an impeller housing. A rotatable shaft carrying an impeller is secured within the support tube by two bearings, one located at the top of the rotatable shaft near the impeller motor, the second located at the bottom of the shaft near the impeller housing. A solder tube attaches to the impeller housing and extends upward to a reservoir. An opening at the base of the housing allows the impeller to draw solder from the base of the solder bath into the impeller housing and propel the solder up through the solder tube to the reservoir. A seal, located at the base of the support tube near the lower bearing, is included to keep solder from damaging the bearing and the shaft. A problem exists regarding effectively enclosing the shaft to eliminate the production of dross.

SUMMARY OF THE INVENTION

In a broad sense the invention provides improved apparatus that circulates a body of molten solder without producing dross. In practice, the invention uses an expandable seal at the outlet of an enclosure through with a rotatable shaft extends. The seal, fitted between the shaft and the enclosure, expands in elevated temperatures during operation to form a solder tight fit between the enclosure and the shaft while allowing free rotation of the impeller shaft.

In another sense, the apparatus of the invention includes an impeller motor located above the body of molten solder. An enclosure, attached to the base of the impeller motor, extends downwardly into the body of molten solder during operation. A rotatable shaft is advantageously attached to the impeller motor by a flexible coupling device. The shaft extends downwardly through the interior of the enclosure to terminate with an impeller beyond the open end of the enclosure in the body of molten solder. The flexible coupling device promotes alignment between the shaft and the exit passageway of the seal during solder circulating operations.

A seal incorporating the features of the invention prevents solder from entering the interior of the enclosure and thereby acts to prevent the production of dross. The seal is comprised of an expandable material, and as the temperature in the solder bath increases during operation, the seal expands, forming a solder tight sealing relationship between itself and the shaft, while allowing shaft rotation.

The use of the invention reduces parts required for assembly and maintenance, while ensuring a reduction of dross and other by-products of a wave soldering system. In addition, the elimination of by-products increases solder joint integrity while safeguarding the environment.

Other objects, features and advantages of the invention will become apparent from a reading of the description of the preferred embodiment of the invention when taken in conjunction with the drawings in which like reference numerals refer to like elements in the several views.

DETAILED DESCRIPTION OF THE PREFERRED EMBODIMENT

Figure 1:
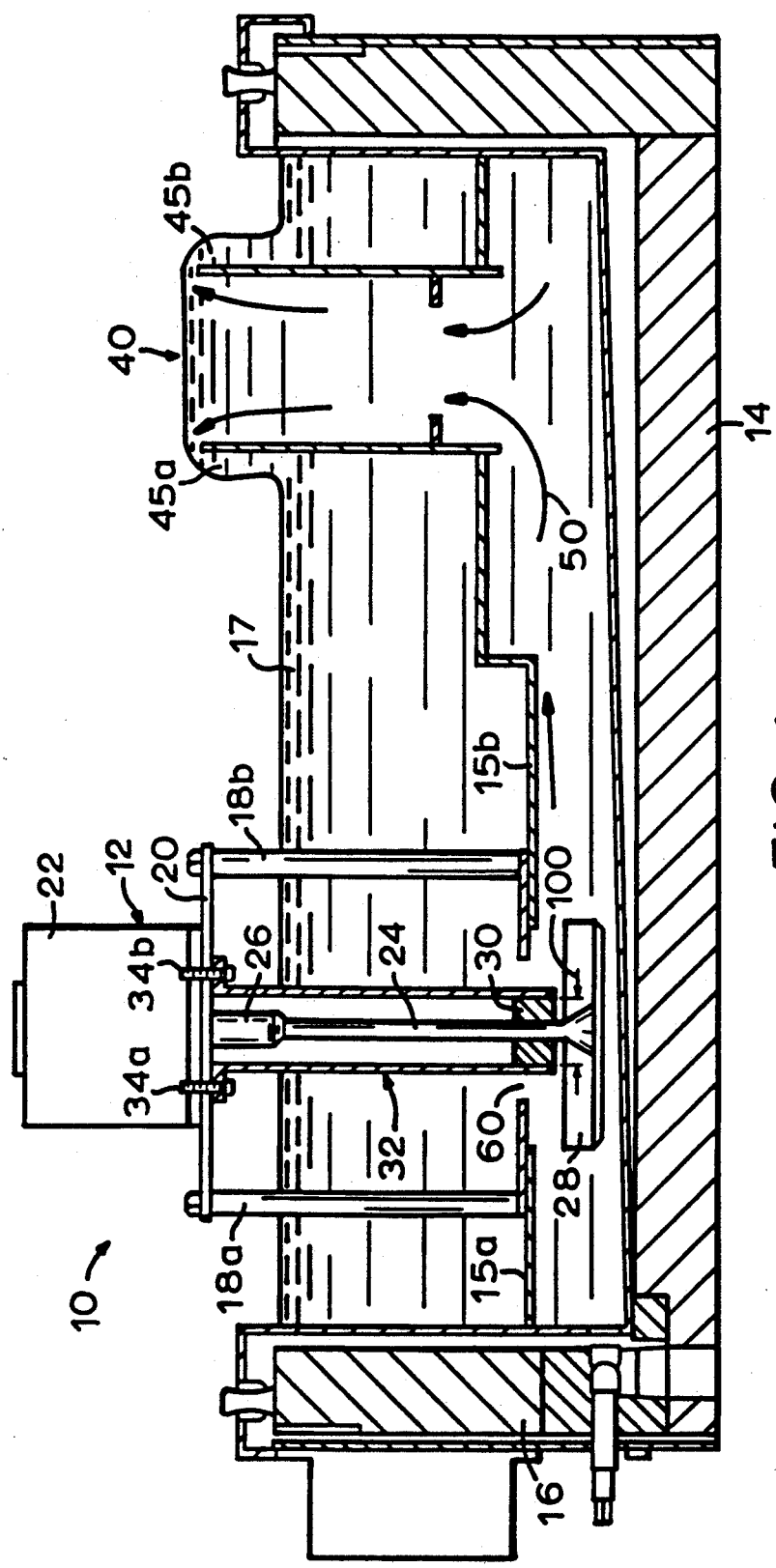
FIG. 1 is a cross-sectional view of the wave solder system that incorporates the circulating apparatus embodying the present invention.

Referring now to the drawings, FIG. 1 shows a cross-sectional elevated view of a wave solder system 10 embodying the present invention. The wave solder system 10 comprises a impeller circulating pump mechanism 12 supported in a solder tub 14 by spaced apart flow dividers 15a and 15b. The solder tub 14 further comprises a heating unit 16. Soldering liquid 17 is contained within the soldering tub 14.

An impeller motor 22 is attached to an impeller motor plate 20, which is supported by impeller support beams 18a and 18b. The impeller support beams 18a and 18b support the impeller motor above the solder bath, and extend downwardly into the solder bath to rest upon flow dividers 15a and 15b. The flow dividers 15a and 15b serve both to support to the impeller motor 22 and to regulate the flow of solder in the solder bath during operation.

An elongated enclosure 32 secured by screws 34a and 34b to the impeller motor plate 20 extends from the impeller motor plate 20 downwardly to a location below the flow dividers 15a and 15b. A rotatable shaft 24 is advantageously attached by a flexible coupler 26 to the output shaft of the impeller motor 22 through an opening in the impeller motor plate 20. The rotatably driven shaft 24 extends downwardly within the enclosure 32, terminating beyond an exit opening 100 at the base of the enclosure 32 and carrying an impeller 28 at its termination.

The interior of the enclosure 32 is protected from invasion of molten solder by a bushing seal 30 located at the exit opening 100 of the enclosure 32, thus eliminating friction between the shaft 24 and the solder 17. The bushing seal 30 has a central passageway 130 extending therethrough and aligned with the shaft 24.

During operation of the wave solder system 10, the heating unit 16 heats the solder 17 of the soldering bath to the desired viscosity. The impeller motor 22 rotates the shaft 24, causing the impeller 28 to circulate within the solder bath. The flow dividers 15a and 15b regulate the flow of solder 17 within the solder bath, causing the solder to be drawn from the surface of the solder bath downward through a impeller opening 60 between the flow dividers 15a and 15b. The solder 17 is urged upwardly in the direction indicated by arrow 50 in FIG. 1 towards wave guides 45a and 45b. As the solder flows upwards over the top of the wave guides 45a and 45b, a wave or swell is formed at the location indicated by arrow 40 in FIG. 1. A circuit board is passed over the wave, at which point solder joints are formed on the circuit board.

Figure 2:
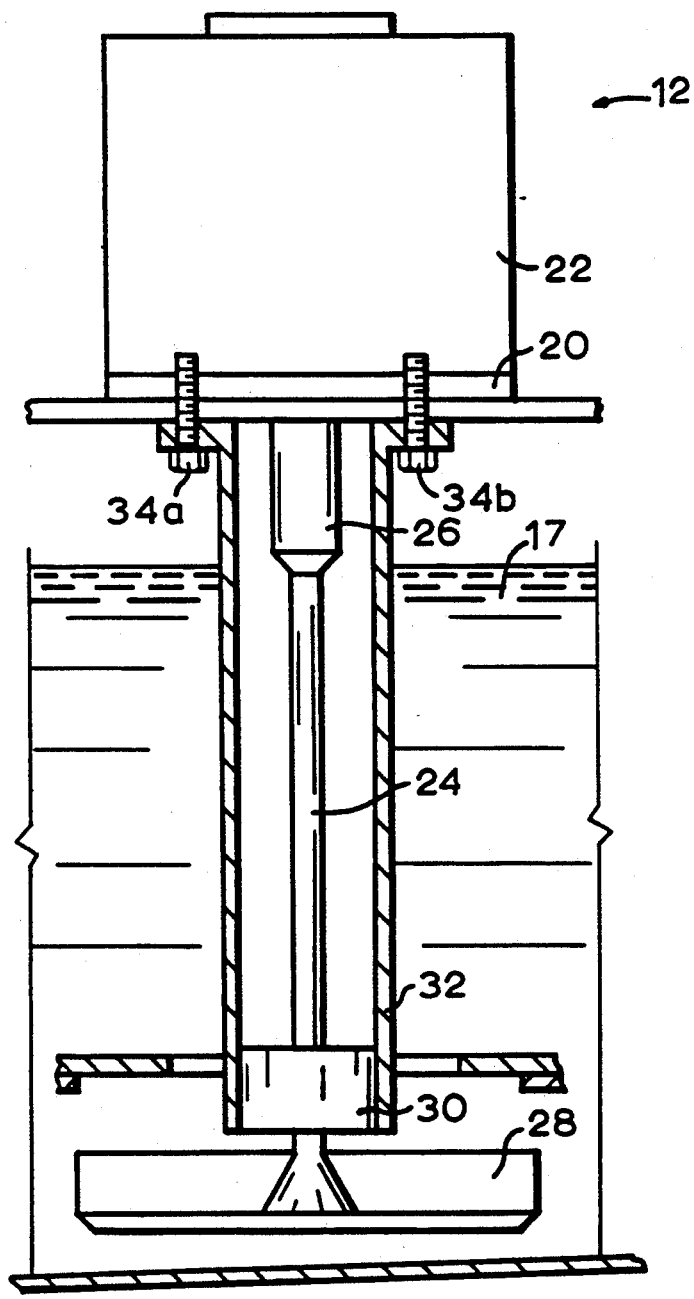
FIG. 2 is an enlarged view of the circulating apparatus, enclosure and seal as shown in FIG. 1.

Presented now in FIG. 2 is an enlarged view of the pump mechanism 12, highlighting the rotatable shaft 24 and enclosure 32. The enclosure 32, attached by screws 34a, 34b to the impeller motor plate 20, is comprised of a high temperature material, for example stainless steel, capable of maintaining rigidity in a high temperature environment. The enclosure 32 extends into the solder bath 17, terminating with the exit opening 100 beneath the surface of the solder. The interior transverse cross sectional area of the enclosure 32 is larger than the transverse cross sectional area of the shaft 24 to allow free movement of the shaft within the enclosure. As shown, the enclosure 32 is tubular in shape, however other shapes can be used, provided its interior allows for free movement of the shaft 24.

As mentioned previously, the shaft 24 extends downwardly and through the exit opening 100 in the enclosure 32. As shown, shaft 24 is made of steel, although other materials which are capable of driving the impeller 28 in a high temperature environment in the range from 300° F. to 750° F. may also be utilized. The shaft 24 as well as the impeller 28 are preferably manufactured from materials, such as steel, with high temperature characteristics which would preclude any resulting by products from entering the molten solder during operation.

Figure 3:
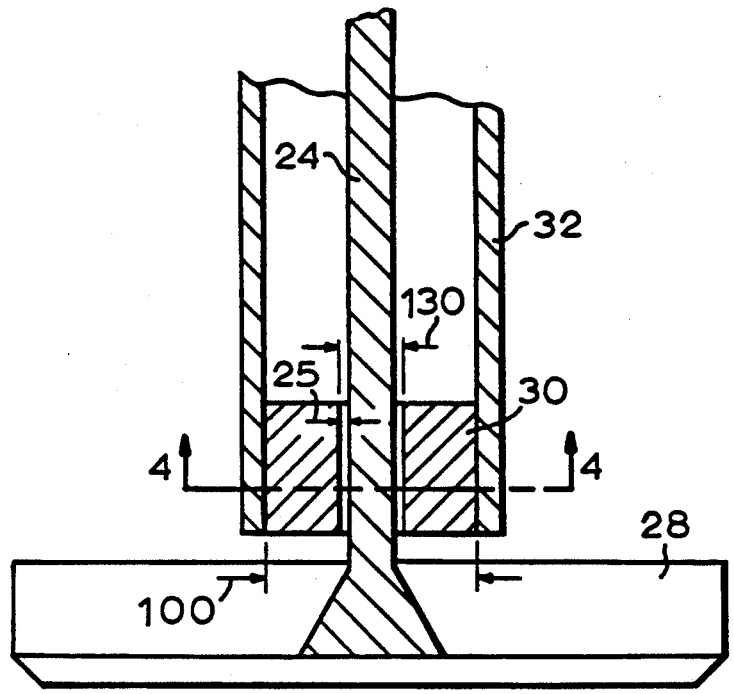
FIG. 3 is yet a further enlarged view of the lower end of a rotatable shaft, highlighting the relationship between a bushing seal, an enclosure and a shaft.
Figure 4:
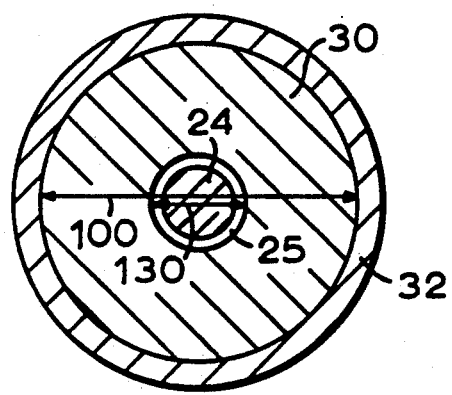
FIG. 4 is a transverse cross sectional view of an enclosure, a bushing seal and a rotatable shaft, taken along line A—A in FIG. 3.

One purpose of the enclosure 32 is to isolate the shaft 24 from the solder bath 17, thus preventing frictional forces between the shaft 24 and the solder 17 from grinding the solder and producing dross. The seal 30, located at the exit opening 100 of the enclosure 32 prohibits solder from entering the enclosure and contacting the rotatable shaft 24. An enlarged view of the sealed lower end of the impeller shaft and seal region is shown in FIG. 3. A transverse cross sectional view of the rotating shaft 24, seal 30 and enclosure 32 is shown in FIG. 4.

At assembly, the seal 30 is snug fitted to the enclosure 32 with the shaft 24 extending through the passageway 130 in the seal 30. At room temperature, the passageway 130 of the seal 30 has a larger cross sectional area than that of the shaft 24, as shown in the Figures. The shaft 24 extends through but does not contact the surfaces of the passageway 130. The optimal space differential 25 between the shaft 24 and the surface of the passageway 130 is a function of the linear thermal expansion coefficient of the material of the seal 30, and the temperature of the solder bath 17. In practice, a space differential 25 equal to 0.004 in is used with a seal material having a linear thermal expansion coefficient equal to $18 \times 10^{-16}$ in/in °F. in a solder bath of 500° F. The exterior face of the seal 30 is matched to the interior face of the enclosure 24 such that at assembly the seal can be snug fitted and retained at the opening 100 of the enclosure 32.

The seal 30 comprises a self lubricating material with controlled expansion at high temperatures. Thus, as the solder is heated to the desired viscosity during operation, the seal 30 expands such that a solder tight sealing fit is achieved between the shaft 24 and the passageway 130 of the seal 30. Likewise, the seal 30 expands to further secure a solder tight seal between its exterior surface and the interior surface of the enclosure 32. A cross sectional view of the rotatable shaft 24, seal 30 and enclosure 32 shown in FIG. 4 further exemplifies the interrelationship between the parts.

The difference between the interior diameter of the seal 30 and the exterior diameter of the rotatable shaft 24 is matched to the expansion characteristic of the seal at the solder viscosity temperature. The self lubricating property of the seal 30 allows for free rotation of the shaft 24 despite the pressure caused by the expanded seal. In practice, the invention has obtained good results using a seal 30 made of polybenzimidazole resin, a unique organic polymer which is available under the name Celazole TM, manufactured by Hoechst Celanese Corporation of Texas. Celazole TM parts possess a low coefficient of friction (0.19 v C1018 Steel), excellent hardness (density of 1.28-1.33 g/cc) and a coefficient of linear thermal expansion equal to $18 \times 10^{-16}$ in/in °F., though materials of like characteristics can be used. As described previously, based on the thermal expansion characteristic, the preferred embodiment utilized a 0.004 in gap between the shaft 24 and the diameter of the passageway 130 at room temperature (such as 50° F. to 80° F.). Upon expansion, the seal 30 provides a solder tight sealing fit while allowing shaft rotation. The density and resistance to fatigue properties of the polybenzimidazole resin precludes resulting by-products due to wear by the shaft 24 on the seal 30. The seal, therefore, serves the dual purposes of sealing and providing rotational stabilization of the shaft, thus minimizing parts to aid in system assembly and maintenance.

Referring again to FIG. 2, a flexible coupler 26 may advantageously connect the rotatable shaft 24 to the impeller motor 22 through an opening in the impeller motor plate 20. The flexible coupler 26 allows for alignment differentials between shaft 24 and the passageway 130 of the seal 30 by transforming the parallel misalignment into an angular displacement within the coupling. Persistent misalignment between the two parts can potentially result in excessive wear and even seizure of the rotatable shaft 24 during rotation. As shown, the flexible coupler 26 is manufactured from steel as one unit with no moving parts, and no backlash. Such a coupler is available under the name HELI-CAL FLEXURE ™ which is manufactured by HELICAL Products Company, Inc. of Texas. Other suitable flexible couplers that are manufactured as one unit and with no backlash can be used.

Although the above description has proceeded with reference to a wave solder system, it is to be understood that the invention may be used in other solder applications.

While there has been shown and described a preferred embodiment, it is to be understood that various other adaptations and modifications may be made within the spirit and scope of the invention.

What we claim is:

1. An apparatus for circulating a body of molten solder in a container during soldering operations comprising:

an enclosure having an interior space with an exit opening located below the surface of said body of molten solder in said container during operations;
    a rotatably mounted shaft extending through said interior space of said enclosure and terminating beyond said exit opening;
    only a bushing seal at said exit opening to provide a seal and rotational stabilization of said shaft, said seal having a passageway through which said shaft extends, the cross sectional area of said passageway being greater than the cross sectional area of said rotatable shaft at room temperature, said seal comprised of a material which enlarges at molten soldering temperatures, the amount of enlargement and the cross sectional area of the passageway being matched such that under the influence of the heat of said molten solder said material enlarges sufficiently to form a sealing relationship between said seal and said shaft while permitting rotation thereof and to form a sealing relationship between said seal and the interior wall surface of said enclosure, the sealing relationship between said seal and said shaft and between said seal and said interior wall surface of said enclosure being effective to prevent entrance of molten solder therebetween;
    means for rotating said shaft comprising a flexible coupling device to compensate for alignment offset between said passageway and said shaft; and
    an impeller carried by said rotatable shaft outside said enclosure, said impeller being rotated by said shaft to circulate said body of molten solder.

2. The apparatus of claim 1, wherein said bushing seal is self-lubricating.

3. The apparatus of claim 1, wherein said bushing seal is made of polybenzimidazole resin.

4. The apparatus of claim 1, wherein said diameter of said shaft is 0.008 inches smaller than said diameter of said opening of said bushing and wherein said molten soldering temperature is in the range from 400° F. to 600° F.

5. An apparatus for circulating a body of molten solder in a container during soldering operations comprising:

an enclosure having an interior space with an exit opening located below the surface of said body of molten solder in said container during operations;
    a shaft extending through said interior space of said enclosure and terminating beyond said exit opening;
    a motor for rotating said shaft;
    only a self lubricating bushing seal at said exit opening to prevent entrance of molten solder into said interior space provide a seal and rotational stabilization of said shaft, said seal being made of polybenzimidazole resin and having a passageway therethrough through which said shaft extends, the cross sectional area diameter of said passageway being 0.008 inches greater than the diameter of said rotatable shaft at room temperature, said seal enlarging sufficiently at elevated temperatures in the vicinity of 500° F. to form a solder sealing relationship between said seal and said shaft while permitting rotation thereof and to increase the exterior size of said seal to form a solder sealing relationship between such said seal and the interior wall surface of said enclosure, the sealing relationship between said seal and said shaft and between said seal and said interior wall surface of said enclosure being effective to prevent entrance of molten solder therebetween;
    a flexible coupling device attaching said shaft to said motor, said flexible coupling device allowing alignment offset between said shaft and said passageway; and
    an impeller carried by said rotatable shaft outside said enclosure, said impeller rotated by said shaft to circulate said body of molten solder.

6. The apparatus of claim 1 wherein said bushing seal is one unitary piece.

* * * * *